(12) United States Patent
Toth et al.

(10) Patent No.: US 11,048,793 B2
(45) Date of Patent: Jun. 29, 2021

(54) DYNAMICALLY GENERATING ACTIVITY PROMPTS TO BUILD AND REFINE MACHINE LEARNING AUTHENTICATION MODELS

(71) Applicant: Bank of America Corporation, Charlotte, NC (US)

(72) Inventors: Michael E. Toth, Charlotte, NC (US); Hitesh Shah, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 16/210,092

(22) Filed: Dec. 5, 2018

(65) Prior Publication Data
US 2020/0184065 A1 Jun. 11, 2020

(51) Int. Cl.
*G06F 21/31* (2013.01)
*G06F 21/45* (2013.01)
*G06N 20/00* (2019.01)

(52) U.S. Cl.
CPC .............. *G06F 21/45* (2013.01); *G06F 21/31* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,647,645 B2 | 1/2010 | Edeki et al. | |
| 8,079,079 B2 | 12/2011 | Zhang et al. | |
| 8,627,438 B1 | 1/2014 | Bhimanaik | |
| 9,203,829 B1 | 12/2015 | Levine et al. | |
| 9,396,332 B2 | 7/2016 | Abrams et al. | |
| 9,509,688 B1 | 11/2016 | Magi Shaashua et al. | |
| 9,536,072 B2 | 1/2017 | Guedalia et al. | |
| 9,692,740 B2 | 6/2017 | Hitchcock et al. | |
| 10,292,051 B2 | 5/2019 | Kusens et al. | |

(Continued)

OTHER PUBLICATIONS

Dec. 9, 2020 U.S. Notice of Allowance and Fees Due—U.S. Appl. No. 16/210,042.

(Continued)

*Primary Examiner* — Joseph P Hirl
*Assistant Examiner* — Hassan Saadoun
(74) *Attorney, Agent, or Firm* — Banner & Witcoff, Ltd.; Michael A. Springs

(57) ABSTRACT

Aspects of the disclosure relate to dynamically generating activity prompts to build and refine machine learning authentication models. A computing platform may process a first set of login events associated with a first user account and may build a first user-specific authentication model for the first user account. Then, the computing platform may process a second set of login events associated with a second user account and may build a second user-specific authentication model for the second user account. The computing platform also may build a population-level authentication model for a plurality of user accounts. Thereafter, the computing platform may identify one or more activity parameters associated with at least one authentication model for refinement. Subsequently, the computing platform may generate and send one or more activity prompts to one or more client computing devices to request at least one user response.

20 Claims, 9 Drawing Sheets

(56) References Cited

U.S. PATENT DOCUMENTS

| | | |
|---|---|---|
| 2007/0289024 A1 | 12/2007 | Mohammed |
| 2009/0089625 A1 | 4/2009 | Kannappan et al. |
| 2009/0100136 A1 | 4/2009 | Jarenskog et al. |
| 2009/0119763 A1 | 5/2009 | Park et al. |
| 2012/0233665 A1 | 9/2012 | Ranganathan et al. |
| 2012/0260322 A1 | 10/2012 | Logan et al. |
| 2012/0323686 A1 | 12/2012 | Burger et al. |
| 2013/0117831 A1 | 5/2013 | Hook et al. |
| 2014/0020073 A1 | 1/2014 | Ronda et al. |
| 2014/0101055 A1 | 4/2014 | Grissom et al. |
| 2015/0052587 A1* | 2/2015 | O'Neill ................ H04L 63/105 726/4 |
| 2015/0256337 A1 | 9/2015 | Nguyen |
| 2016/0092870 A1 | 3/2016 | Salama et al. |
| 2016/0094546 A1 | 3/2016 | Innes et al. |
| 2016/0239649 A1 | 8/2016 | Zhao |
| 2016/0277481 A1 | 9/2016 | Yang |
| 2016/0381080 A1* | 12/2016 | Reddem ................ G06F 21/31 726/1 |
| 2017/0041296 A1 | 2/2017 | Ford et al. |
| 2017/0048252 A1 | 2/2017 | Straub et al. |
| 2017/0078225 A1 | 3/2017 | Pandey et al. |
| 2017/0227995 A1 | 8/2017 | Lee et al. |
| 2017/0230344 A1 | 8/2017 | Dhar et al. |
| 2017/0244757 A1 | 8/2017 | Castinado et al. |
| 2017/0317993 A1 | 11/2017 | Weber et al. |
| 2017/0331816 A1 | 11/2017 | Votaw et al. |
| 2017/0346821 A1 | 11/2017 | Yedidi et al. |
| 2018/0007553 A1 | 1/2018 | Dutt et al. |
| 2018/0020009 A1 | 1/2018 | Wei et al. |
| 2018/0063122 A1 | 3/2018 | Enoki et al. |
| 2018/0131685 A1 | 5/2018 | Sridhar et al. |
| 2018/0139199 A1 | 5/2018 | Ahuja et al. |
| 2018/0164959 A1 | 6/2018 | Gupta et al. |
| 2018/0167816 A1 | 6/2018 | Kusens et al. |
| 2018/0183586 A1 | 6/2018 | Bhargav-Spantzel et al. |
| 2018/0234464 A1 | 8/2018 | Sim et al. |
| 2018/0249285 A1 | 8/2018 | Shaw et al. |
| 2018/0249292 A1 | 8/2018 | Skaaksrud |
| 2018/0251132 A1 | 9/2018 | Phelan |
| 2018/0253682 A1 | 9/2018 | Gilman et al. |
| 2018/0253713 A1 | 9/2018 | Ready et al. |
| 2018/0253718 A1 | 9/2018 | Khan et al. |
| 2018/0253840 A1 | 9/2018 | Tran |
| 2018/0254101 A1 | 9/2018 | Gilmore et al. |
| 2018/0255000 A1 | 9/2018 | Castinado et al. |
| 2018/0255060 A1 | 9/2018 | Bansal |
| 2018/0255084 A1 | 9/2018 | Kotinas et al. |
| 2018/0255422 A1 | 9/2018 | Montemurro et al. |
| 2018/0255456 A1 | 9/2018 | Yin et al. |
| 2018/0260384 A1 | 9/2018 | Pasupalak et al. |
| 2018/0260553 A1 | 9/2018 | Hoyos et al. |
| 2018/0260641 A1 | 9/2018 | Yadhunandan et al. |
| 2018/0260743 A1 | 9/2018 | Block et al. |
| 2018/0261060 A1 | 9/2018 | Siminoff et al. |
| 2018/0261126 A1 | 9/2018 | Rios et al. |
| 2018/0262388 A1 | 9/2018 | Johnson et al. |
| 2018/0262529 A1 | 9/2018 | Allen |
| 2018/0262597 A1 | 9/2018 | Matthieu et al. |
| 2018/0262620 A1 | 9/2018 | Wolthuis et al. |
| 2018/0262810 A1 | 9/2018 | Cronk et al. |
| 2018/0262909 A1 | 9/2018 | Rotter et al. |
| 2018/0264347 A1 | 9/2018 | Tran et al. |
| 2018/0268015 A1 | 9/2018 | Sugaberry |
| 2018/0268408 A1 | 9/2018 | Botros et al. |
| 2018/0268632 A1 | 9/2018 | Malhotra |
| 2018/0268674 A1 | 9/2018 | Siminoff |
| 2018/0268691 A1 | 9/2018 | Meredith et al. |
| 2018/0268818 A1 | 9/2018 | Schoenmackers et al. |
| 2018/0268944 A1 | 9/2018 | Prakash |
| 2018/0269554 A1 | 9/2018 | Sanford |
| 2018/0269927 A1 | 9/2018 | Gerszberg et al. |
| 2018/0270276 A9 | 9/2018 | Logue et al. |
| 2018/0270549 A1 | 9/2018 | Awiszus et al. |
| 2018/0270608 A1 | 9/2018 | Thoresen et al. |
| 2018/0270612 A1 | 9/2018 | Thoresen et al. |
| 2018/0274876 A1 | 9/2018 | Stewart et al. |
| 2018/0275765 A1 | 9/2018 | Roth et al. |
| 2018/0276041 A1 | 9/2018 | Bansal et al. |
| 2018/0276205 A1 | 9/2018 | Auger |
| 2018/0276261 A1 | 9/2018 | Smart |
| 2018/0276495 A1 | 9/2018 | Yu et al. |
| 2018/0276710 A1 | 9/2018 | Tietzen et al. |
| 2018/0278496 A1 | 9/2018 | Kulshreshtha et al. |
| 2018/0278597 A1 | 9/2018 | Helms et al. |
| 2018/0278648 A1 | 9/2018 | Li et al. |
| 2018/0278740 A1 | 9/2018 | Choi et al. |
| 2018/0301148 A1 | 10/2018 | Roman et al. |
| 2018/0301149 A1 | 10/2018 | Roman et al. |
| 2018/0302284 A1 | 10/2018 | Roman et al. |
| 2018/0302285 A1 | 10/2018 | Roman et al. |
| 2018/0302362 A1 | 10/2018 | Abedini et al. |
| 2018/0302363 A1 | 10/2018 | Abedini et al. |
| 2018/0302418 A1 | 10/2018 | Scasny |
| 2018/0302420 A1 | 10/2018 | Nakanelua et al. |
| 2018/0302423 A1 | 10/2018 | Muddu et al. |
| 2018/0302425 A1 | 10/2018 | Esman, Sr. et al. |
| 2018/0307303 A1 | 10/2018 | Powderly et al. |
| 2018/0307399 A1 | 10/2018 | Sandilya et al. |
| 2018/0307908 A1 | 10/2018 | O'Brien et al. |
| 2018/0307909 A1 | 10/2018 | O'Brien et al. |
| 2018/0308073 A1 | 10/2018 | Kurian et al. |
| 2018/0308100 A1 | 10/2018 | Haukioja et al. |
| 2018/0308473 A1 | 10/2018 | Scholar |
| 2018/0309752 A1 | 10/2018 | Villavicencio et al. |
| 2018/0310159 A1 | 10/2018 | Katz et al. |
| 2018/0314689 A1 | 11/2018 | Wang et al. |
| 2018/0315110 A1 | 11/2018 | Kannan et al. |
| 2018/0315499 A1 | 11/2018 | Appelbaum et al. |
| 2018/0316852 A1 | 11/2018 | Graham et al. |
| 2018/0317146 A1 | 11/2018 | Fitzpatrick |
| 2018/0320967 A1 | 11/2018 | Kaloudis et al. |
| 2018/0321185 A1 | 11/2018 | Bantas et al. |
| 2018/0321666 A1 | 11/2018 | Cella et al. |
| 2018/0321667 A1 | 11/2018 | Cella et al. |
| 2018/0321672 A1 | 11/2018 | Cella et al. |
| 2018/0322419 A1 | 11/2018 | Bugenhagen |
| 2018/0322436 A1 | 11/2018 | Sotiroudas et al. |
| 2018/0322879 A1 | 11/2018 | Bhaya et al. |
| 2018/0322961 A1 | 11/2018 | Kim et al. |
| 2018/0326150 A1 | 11/2018 | Davis et al. |
| 2018/0326291 A1 | 11/2018 | Tran et al. |
| 2018/0329738 A1 | 11/2018 | Kasha et al. |
| 2018/0329744 A1 | 11/2018 | Shear et al. |
| 2018/0330000 A1 | 11/2018 | Noble et al. |
| 2018/0330059 A1 | 11/2018 | Bates et al. |
| 2018/0330248 A1 | 11/2018 | Burhanuddin et al. |
| 2018/0330417 A1 | 11/2018 | Wollmer et al. |
| 2018/0332132 A1 | 11/2018 | Sampath et al. |
| 2018/0335776 A1 | 11/2018 | Theis et al. |
| 2018/0336638 A1 | 11/2018 | Dziabiak et al. |
| 2018/0336639 A1 | 11/2018 | Dziabiak et al. |
| 2018/0336640 A1 | 11/2018 | Dziabiak et al. |
| 2018/0336641 A1 | 11/2018 | Dziabiak et al. |
| 2018/0336905 A1 | 11/2018 | Kim et al. |
| 2018/0337966 A1 | 11/2018 | Pearl et al. |
| 2018/0338120 A1 | 11/2018 | Lemberger et al. |
| 2018/0338330 A1 | 11/2018 | Ledvina et al. |
| 2019/0028462 A1 | 1/2019 | Ishikawa et al. |
| 2019/0057386 A1 | 2/2019 | Fazeli et al. |
| 2019/0098503 A1* | 3/2019 | Dutt ................ H04W 12/065 |
| 2019/0166112 A1 | 5/2019 | Gordon et al. |
| 2019/0166485 A1 | 5/2019 | Namiranian |
| 2019/0190704 A1 | 6/2019 | Srivastava et al. |
| 2019/0220583 A1 | 7/2019 | Douglas et al. |
| 2019/0245848 A1 | 8/2019 | Divoux et al. |
| 2019/0332691 A1 | 10/2019 | Beadles et al. |
| 2019/0372968 A1* | 12/2019 | Balogh ................ G06K 9/6254 |
| 2019/0392162 A1 | 12/2019 | Stern et al. |
| 2020/0007530 A1 | 1/2020 | Mohamad Abdul et al. |
| 2020/0162454 A1 | 5/2020 | Jain et al. |
| 2020/0184048 A1 | 6/2020 | Toth et al. |
| 2020/0184049 A1 | 6/2020 | Toth et al. |
| 2020/0184051 A1 | 6/2020 | Toth et al. |

(56) References Cited

U.S. PATENT DOCUMENTS

2020/0184065 A1 6/2020 Toth et al.
2020/0186518 A1 6/2020 Shah
2020/0235933 A1 7/2020 Redkokashin

OTHER PUBLICATIONS

Dec. 11, 2020 U.S. Non-Final Office Action—U.S. Appl. No. 16/210,010.
Dec. 7, 2020 U.S. Notice of Allowance and Fees Due—U.S. Appl. No. 16/210,028.
"Baseline Information Security Standard," University of Colorado Office of Information Security, revised Sep. 12, 2013 retrieved from https://www.cu.edu/ security/system-wide-baseline-security-standards, 28 pages.
Aug. 4, 2020 U.S. Non-Final Office Action—U.S. Appl. No. 16/210,028.
Dec. 11, 2020 U.S. Notice of Allowance and Fees Due—U.S. Appl. No. 16/210,062.
Aug. 13, 2020 U.S. Non-Final Office Action—U.S. Appl. No. 16/210,117.
Dec. 15, U.S. Notice of Allowance and Fees Due—U.S. Appl. No. 16/210,117.

* cited by examiner

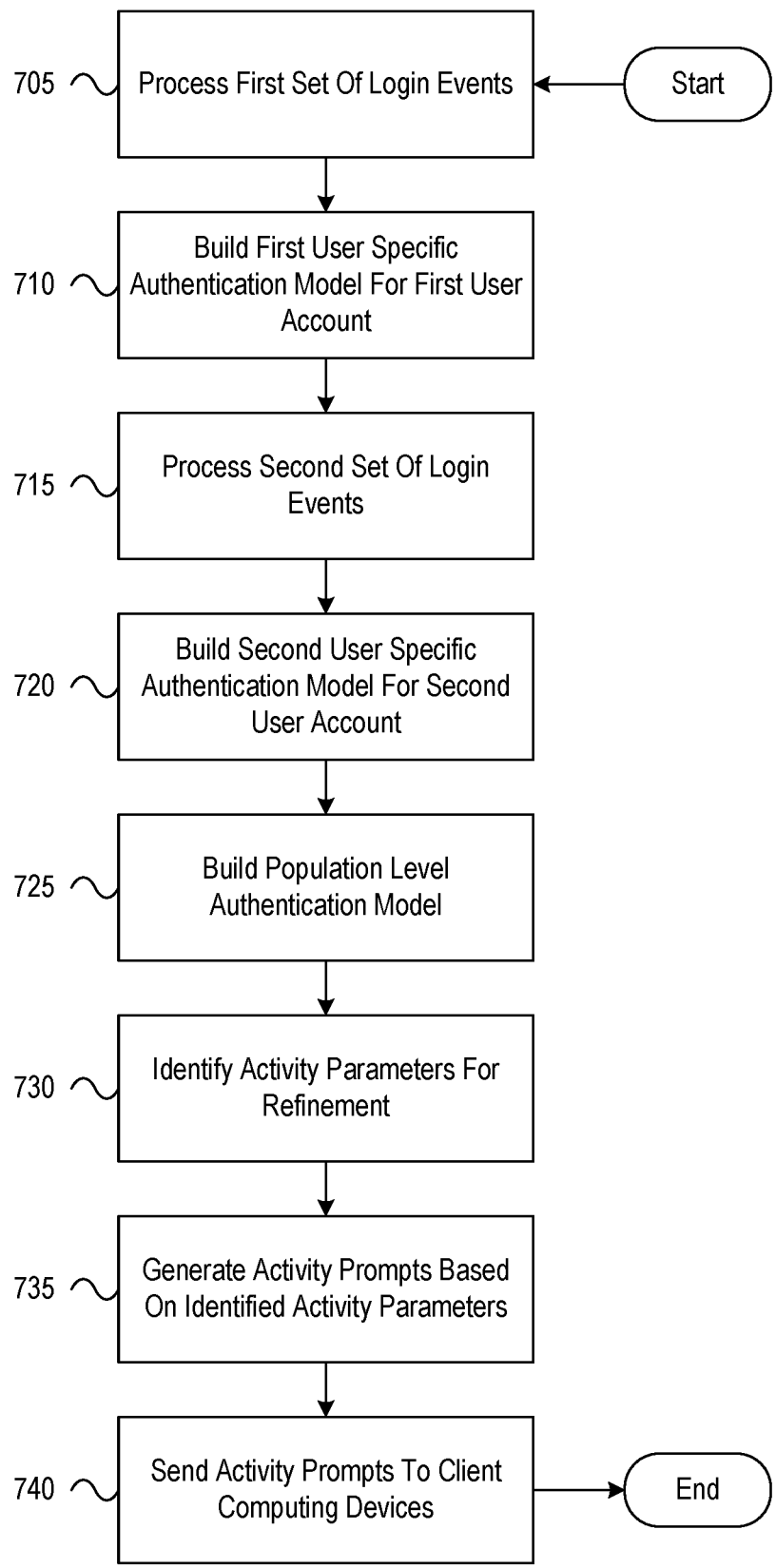

DYNAMICALLY GENERATING ACTIVITY PROMPTS TO BUILD AND REFINE MACHINE LEARNING AUTHENTICATION MODELS

BACKGROUND

Aspects of the disclosure relate to providing information security and preventing unauthorized access to resources of an information system. In particular, one or more aspects of the disclosure relate to preventing unauthorized access to information resources by dynamically generating activity prompts to build and refine machine learning authentication models.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by dynamically generating activity prompts to build and refine machine learning authentication models.

In accordance with one or more embodiments, a computing platform having at least one processor, a communication interface, and memory may process a first set of login events associated with a first user account. Subsequently, the computing platform may build a first user-specific authentication model for the first user account based on first activity data captured during the first set of login events associated with the first user account. Then, the computing platform may process a second set of login events associated with a second user account. Subsequently, the computing platform may build a second user-specific authentication model for the second user account based on second activity data captured during the second set of login events associated with the second user account. In addition, the computing platform may build a population-level authentication model for a plurality of user accounts based on the first activity data captured during the first set of login events associated with the first user account and the second activity data captured during the second set of login events associated with the second user account. Thereafter, the computing platform may identify one or more activity parameters associated with at least one authentication model for refinement. Subsequently, the computing platform may generate one or more activity prompts based on the one or more activity parameters associated with the at least one authentication model identified for refinement. Then, the computing platform may send, via the communication interface, to at least one client computing device, at least one activity prompt of the one or more activity prompts, and sending the at least one activity prompt of the one or more activity prompts may cause the at least one client computing device to request at least one user response corresponding to the at least one activity prompt of the one or more activity prompts.

In some embodiments, processing the first set of login events associated with the first user account may include: receiving, via the communication interface, from an account portal computing platform, a first authentication request associated with a first client computing device requesting access to one or more secured information resources associated with the first user account; validating one or more authentication credentials associated with the first authentication request; and based on validating the one or more authentication credentials associated with the first authentication request, generating one or more authentication commands directing the account portal computing platform to provide the first client computing device with access to the one or more secured information resources associated with the first user account.

In some embodiments, building the first user-specific authentication model for the first user account may include: receiving parameter-based activity data associated with at least two login events involving the first user account; calculating one or more profile values for one or more authentication parameters based on the parameter-based activity data associated with the at least two login events involving the first user account; and storing the one or more profile values calculated for the one or more authentication parameters in a dataset defining the first user-specific authentication model.

In some embodiments, the first activity data captured during the first set of login events associated with the first user account may include information identifying one or more device identifiers, one or more network addresses, one or more internet service providers, one or more device versions, one or more device operating systems, one or more device operating system versions, one or more device locations, one or more requested channels, one or more requested pages, one or more sequences of page requests, or one or more timings between page requests.

In some embodiments, processing the second set of login events associated with the second user account may include: receiving, via the communication interface, from an account portal computing platform, a second authentication request associated with a second client computing device requesting access to one or more secured information resources associated with the second user account; validating one or more authentication credentials associated with the second authentication request; and based on validating the one or more authentication credentials associated with the second authentication request, generating one or more authentication commands directing the account portal computing platform to provide the second client computing device with access to the one or more secured information resources associated with the second user account.

In some embodiments, building the second user-specific authentication model for the second user account may include: receiving parameter-based activity data associated with at least two login events involving the second user account; calculating one or more profile values for one or more authentication parameters based on the parameter-based activity data associated with the at least two login events involving the second user account; and storing the one or more profile values calculated for the one or more authentication parameters in a dataset defining the second user-specific authentication model.

In some embodiments, the second activity data captured during the second set of login events associated with the second user account may include information identifying one or more device identifiers, one or more network addresses, one or more internet service providers, one or more device versions, one or more device operating systems, one or more device operating system versions, one or more device locations, one or more requested channels, one or more requested pages, one or more sequences of page requests, or one or more timings between page requests.

In some embodiments, building the population-level authentication model for the plurality of user accounts may include: receiving parameter-based activity data associated with at least two login events involving at least two different user accounts; calculating one or more population-target values for one or more authentication parameters based on the parameter-based activity data associated with the at least two login events involving the at least two different user accounts; and storing the one or more population-target values calculated for the one or more authentication parameters in a dataset defining the population-level authentication model.

In some embodiments, identifying the one or more activity parameters associated with the at least one authentication model for refinement may include identifying a first activity parameter for refinement in response to determining that an amount of measured data associated with the first activity parameter is below a predetermined threshold corresponding to the first activity parameter.

In some embodiments, identifying the one or more activity parameters associated with the at least one authentication model for refinement may include identifying a second activity parameter for refinement in response to determining that measured data associated with the second activity parameter has expired.

In some embodiments, identifying the one or more activity parameters associated with the at least one authentication model for refinement may include determining that the first user-specific authentication model for the first user account or the second user-specific authentication model for the second user account requires refinement.

In some embodiments, identifying the one or more activity parameters associated with the at least one authentication model for refinement may include determining that the population-level authentication model for the plurality of user accounts requires refinement.

In some embodiments, generating the one or more activity prompts based on the one or more activity parameters associated with the at least one authentication model identified for refinement may include generating at least one activity prompt requesting a user to login via a specific channel of a plurality of channels via which secured information resources are accessible.

In some embodiments, generating the one or more activity prompts based on the one or more activity parameters associated with the at least one authentication model identified for refinement may include generating at least one activity prompt requesting a user to login using one or more specific authenticators of a plurality of authenticators implemented by the computing platform.

In some embodiments, generating the one or more activity prompts based on the one or more activity parameters associated with the at least one authentication model identified for refinement may include generating at least one activity prompt requesting a user to login to a portal hosted by an account portal computing platform and use one or more specific functions of a plurality of functions provided via the portal hosted by the account portal computing platform.

In some embodiments, the computing platform may receive at least one response to the at least one activity prompt of the one or more activity prompts. Subsequently, the computing platform may update the first user-specific authentication model for the first user account based on the at least one response to the at least one activity prompt of the one or more activity prompts.

In some embodiments, the computing platform may receive at least one response to the at least one activity prompt of the one or more activity prompts. Subsequently, the computing platform may update the second user-specific authentication model for the second user account based on the at least one response to the at least one activity prompt of the one or more activity prompts.

In some embodiments, the computing platform may receive at least one response to the at least one activity prompt of the one or more activity prompts. Subsequently, the computing platform may update the population-level authentication model for the plurality of user accounts based on the at least one response to the at least one activity prompt of the one or more activity prompts.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 7 depicts an illustrative method for dynamically generating activity prompts to build and refine machine learning authentication models in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamically generating activity prompts for users that prompt users to complete specific activities that are tracked by a computing platform and used by the computing platform in building population-level and user-specific machine learning models. For example, the computing platform may generate activity prompts for a group of users that prompt the users to complete certain tasks (e.g., in online banking or mobile banking) so as to enable the computing platform to capture data associated with the users' interactions and build a population-level machine learning dataset. In addition, the computing platform may generate activity prompts for a specific user to prompt the user to complete certain tasks so as to enable the computing platform to build a user-specific machine learning dataset. In both instances, the computing platform may dynamically generate the activity prompts based on what activities are already reflected in the datasets and what activities are not yet reflected in the datasets. In addition, certain activities (e.g., updating/validating contact information) may be associated with a timing parameter, which the computing platform may use to give greater weight to more recently updated information and/or may use to prompt the user to periodically update certain information. In some instances, the user may receive rewards (e.g., points redeemable for cash or discounts) based on completing the activities corresponding to the prompts generated by the computing platform.

Figure 1A:
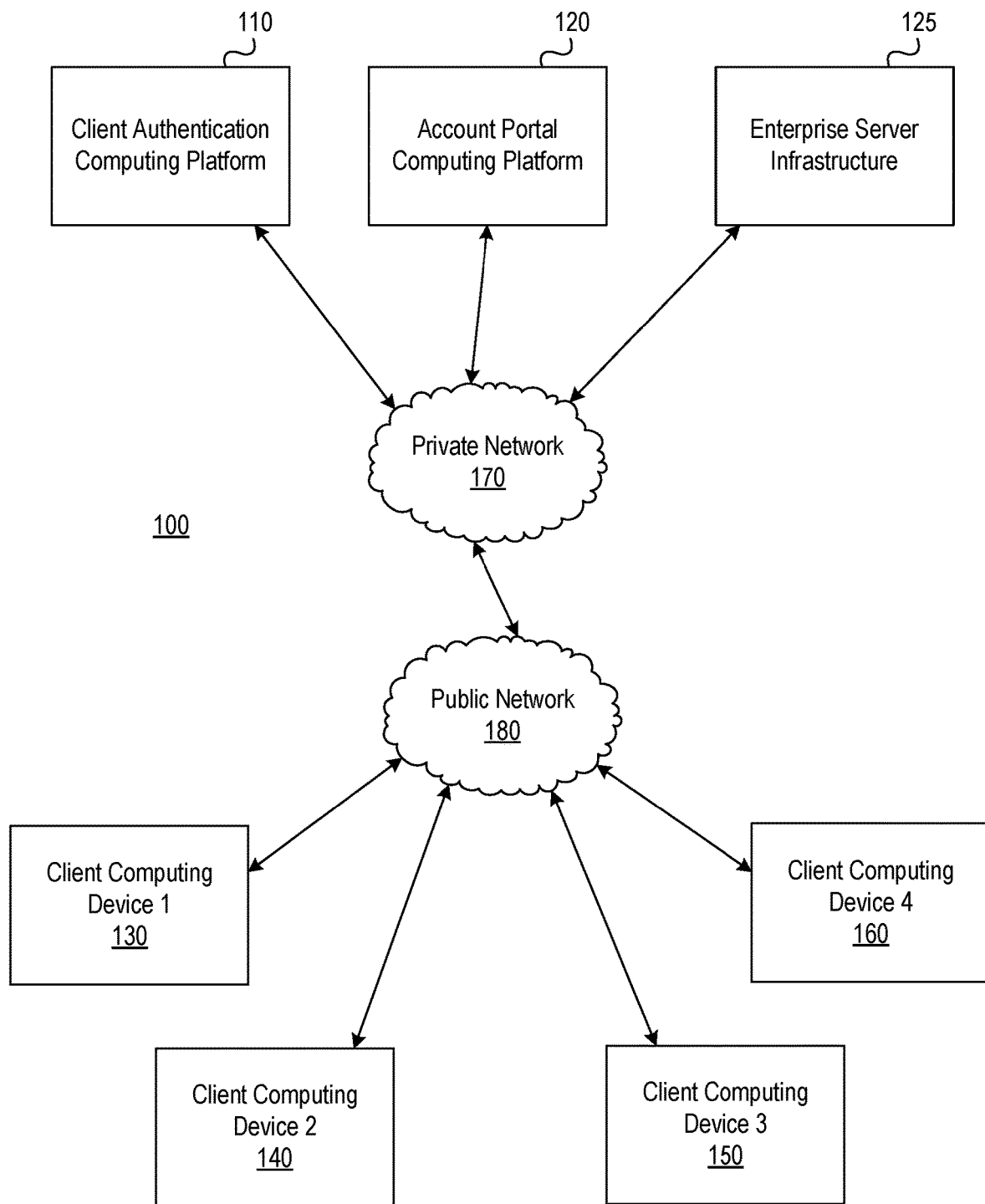
FIGS. 1A and 1B depict an illustrative computing environment for dynamically generating activity prompts to build and refine machine learning authentication models in accordance with one or more example embodiments.
Figure 1B:
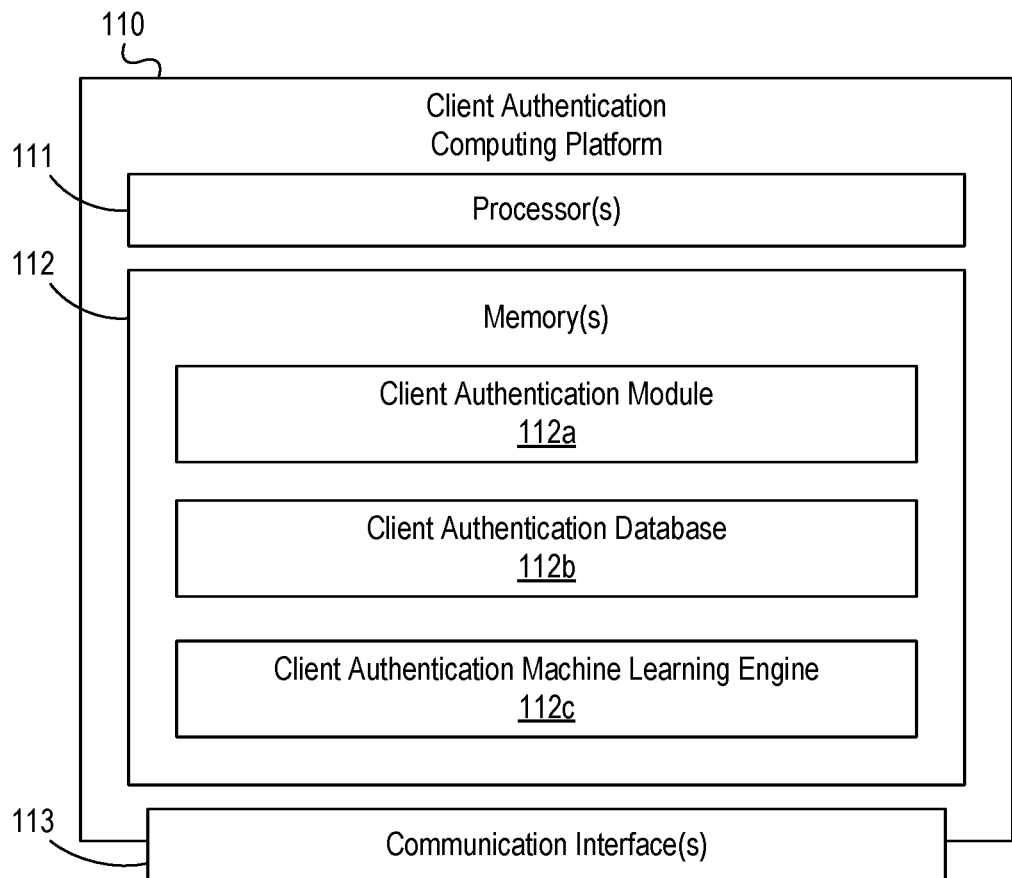

FIGS. 1A and 1B depict an illustrative computing environment for dynamically generating activity prompts to build and refine machine learning authentication models in accordance with one or more example embodiments. Referring to FIG. 1A, computing environment 100 may include one or more computer systems. For example, computing environment 100 may include a client authentication computing platform 110, an account portal computing platform 120, enterprise server infrastructure 125, a first client computing device 130, a second client computing device 140, a third client computing device 150, and a fourth client computing device 160.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Account portal computing platform 120 may include one or more computing devices and/or other computer components (e.g., processors, memories, communication interfaces). In addition, and as illustrated in greater detail below, account portal computing platform 120 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by account portal computing platform 120 may be associated with a client portal provided by an organization, such as an online banking portal or a mobile banking portal provided by a financial institution. Such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Enterprise server infrastructure 125 may include one or more computing devices and/or other computer components (e.g., processors, memories, communication interfaces). In addition, and as illustrated in greater detail below, enterprise server infrastructure 125 may be configured to provide various enterprise and/or back-office computing functions for an organization, such as a financial institution. For example, enterprise server infrastructure 125 may include various servers and/or databases that store and/or otherwise maintain account information, such as financial account information including account balances, transaction history, account owner information, and/or other information. In addition, enterprise server infrastructure 125 may process and/or otherwise execute transactions on specific accounts based on commands and/or other information received from account portal computing platform 120 and/or other computer systems included in computing environment 100.

Client computing device 130 may be a personal computing device (e.g., desktop computer, laptop computer) or mobile computing device (e.g., smartphone, tablet) that may be linked to and/or used by a first user (e.g., of a client portal provided by account portal computing platform 120). Client computing device 140 may be a personal computing device (e.g., desktop computer, laptop computer) or mobile computing device (e.g., smartphone, tablet) that also may be linked to and/or used by the first user (e.g., of a client portal provided by account portal computing platform 120). Client computing device 150 may be a personal computing device (e.g., desktop computer, laptop computer) or mobile computing device (e.g., smartphone, tablet) that may be linked to and/or used by a second user (e.g., of a client portal provided by account portal computing platform 120) different from the first user. Client computing device 160 may be a personal computing device (e.g., desktop computer, laptop computer) or mobile computing device (e.g., smartphone, tablet) that also may be linked to and/or used by the second user (e.g., of a client portal provided by account portal computing platform 120).

Computing environment 100 also may include one or more networks, which may interconnect one or more of client authentication computing platform 110, account portal computing platform 120, enterprise server infrastructure 125, client computing device 130, client computing device 140, client computing device 150, and client computing device 160. For example, computing environment 100 may include a private network 170 (which may, e.g., interconnect client authentication computing platform 110, account portal computing platform 120, enterprise server infrastructure 125, and/or one or more other systems which may be associated with an organization, such as a financial institution) and public network 180 (which may, e.g., interconnect client computing device 130, client computing device 140, client computing device 150, and client computing device 160 with private network 170 and/or one or more other systems, public networks, sub-networks, and/or the like).

In one or more arrangements, client computing device 130, client computing device 140, client computing device 150, client computing device 160, and/or the other systems included in computing environment 100 may be any type of computing device capable of receiving a user interface, receiving input via the user interface, and communicating the received input to one or more other computing devices. For example, client computing device 130, client computing device 140, client computing device 150, client computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client authentication computing platform 110, account portal computing platform 120, enterprise server infrastructure 125, client computing device 130, client computing device 140, client computing device 150, and client computing device 160 may, in some instances, be special-purpose computing devices configured to perform specific functions.

Referring to FIG. 1B, client authentication computing platform 110 may include one or more processors 111, memory 112, and communication interface 113. A data bus may interconnect processor 111, memory 112, and communication interface 113. Communication interface 113 may be a network interface configured to support communication between client authentication computing platform 110 and one or more networks (e.g., network 170, network 180, or the like). Memory 112 may include one or more program modules having instructions that when executed by processor 111 cause client authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112a, a client authentication database 112b, and a client authentication machine learning engine 112c. Client authentication module 112a may have instructions that direct and/or cause client authentication computing platform 110 to control access to resources of an information system by dynamically generating activity prompts to build and refine machine learning authentication models, as discussed in greater detail below. Client authentication database 112b may store information used by client authentication module 112a and/or client authentication computing platform 110 in controlling access to resources of an information system by dynamically generating activity prompts to build and refine machine learning authentication models and/or in performing other functions. Client authentication machine learning engine 112c may build and/or refine one or more authentication models based on captured and/or logged user activity and/or other interaction data, as illustrated in greater detail below.

Figure 2A:
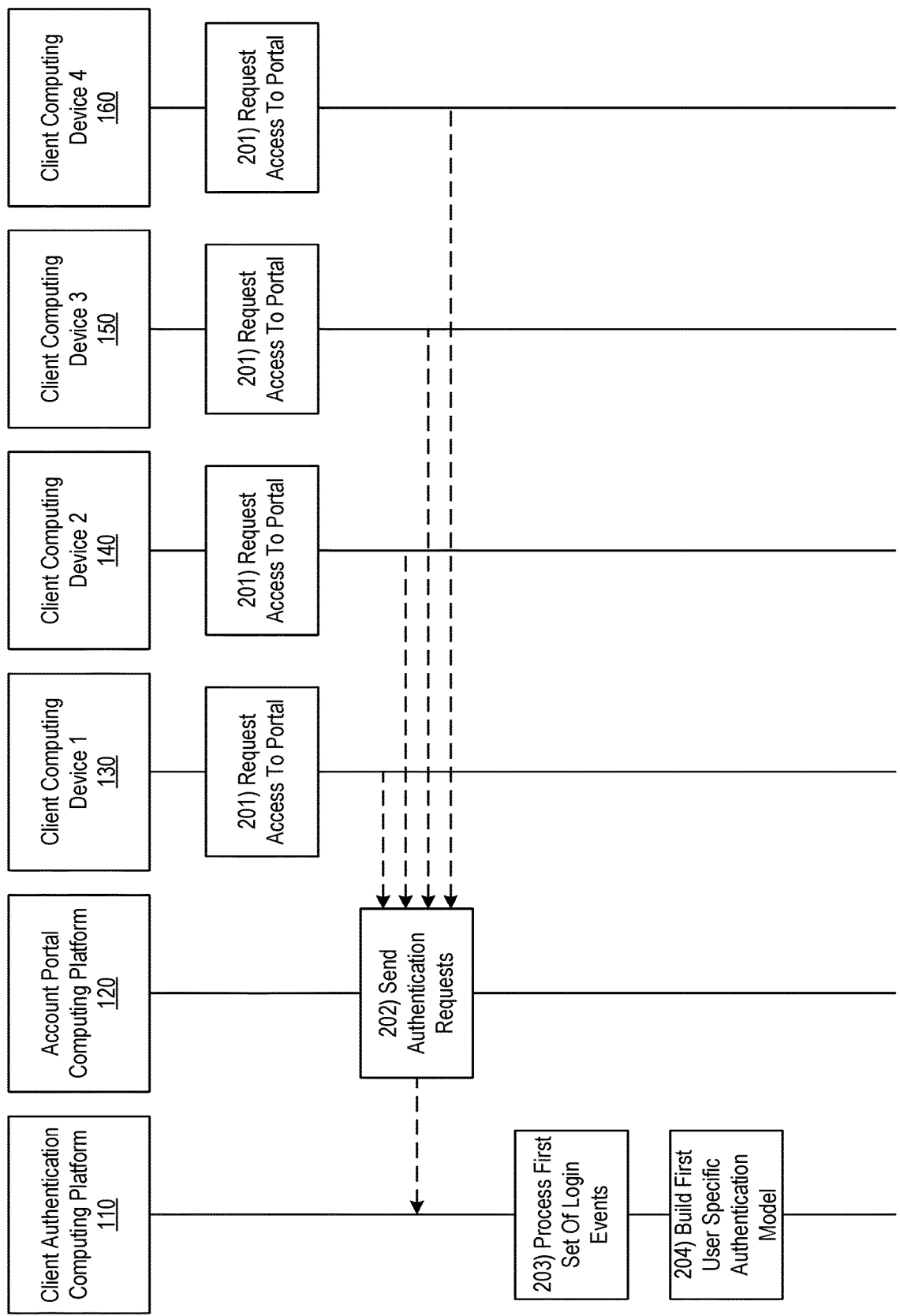
FIGS. 2A-2D depict an illustrative event sequence for dynamically generating activity prompts to build and refine machine learning authentication models in accordance with one or more example embodiments.

FIGS. 2A-2D depict an illustrative event sequence for dynamically generating activity prompts to build and refine machine learning authentication models in accordance with one or more example embodiments. Referring to FIG. 2A, at step 201, one or more user devices may request access to one or more user accounts associated with a portal hosted by account portal computing platform 120. For example, at step 201, client computing device 130, client computing device 140, client computing device 150, and/or client computing device 160 may request access to one or more user accounts associated with a portal hosted by account portal computing platform 120 by generating and/or sending one or more access requests to account portal computing platform 120. Although the access requests are illustrated together, each individual access request may be sent and/or received at different times (e.g., and each may be separated by significant amounts of time, such as several hours, several day, several weeks, or the like).

At step 202, account portal computing platform 120 may send one or more authentication requests to client authentication computing platform 110. For example, at step 202, account portal computing platform 120 may send one or more authentication requests to client authentication computing platform 110 to authenticate one or more users to one or more user accounts associated with the portal hosted by account portal computing platform 120 based on the one or more access requests received by account portal computing platform 120 at step 201. Although the authentication requests are illustrated together, each individual authentication request may be sent and/or received at different times (e.g., and each may be separated by significant amounts of time, such as several hours, several day, several weeks, or the like).

At step 203, client authentication computing platform 110 may process a first set of login events associated with a first user account. For instance, over a significant period of time (e.g., several hours, several day, several weeks, or the like), client authentication computing platform 110 may process a first set of login events associated with a first user account (which may, e.g., be linked to a user of client computing device 130 and/or client computing device 140).

In some embodiments, processing the first set of login events associated with the first user account may include: receiving, via the communication interface, from an account portal computing platform, a first authentication request associated with a first client computing device requesting access to one or more secured information resources associated with the first user account; validating one or more authentication credentials associated with the first authentication request; and based on validating the one or more authentication credentials associated with the first authentication request, generating one or more authentication commands directing the account portal computing platform to provide the first client computing device with access to the one or more secured information resources associated with the first user account. For example, in processing the first set of login events associated with the first user account at step 203, client authentication computing platform 110 may receive, via the communication interface (e.g., communication interface 113), from an account portal computing platform (e.g., account portal computing platform 120), a first authentication request associated with a first client computing device (e.g., client computing device 130) requesting access to one or more secured information resources associated with the first user account. Subsequently, client authentication computing platform 110 may validate one or more authentication credentials associated with the first authentication request (e.g., a username, password, one-time passcode, biometric credentials, and/or other credentials received from client computing device 130 and/or account portal computing platform 120). Then, based on validating the one or more authentication credentials associated with the first authentication request, client authentication computing platform 110 may generate one or more authentication commands directing the account portal computing platform (e.g., account portal computing platform 120) to provide the first client computing device (e.g., client computing device 130) with access to the one or more secured information resources associated with the first user account. In addition, client authentication computing platform 110 may send these commands to account portal computing platform 120 to trigger and/or otherwise cause account portal computing platform 120 to provide client computing device 130 with access to the first user account.

At step 204, client authentication computing platform 110 may build a user-specific authentication model. For example, at step 204, client authentication computing platform 110 may build a first user-specific authentication model for the first user account based on first activity data captured during the first set of login events associated with the first user account. The first activity data captured during the first set of login events associated with the first user account may, for instance, include activity data captured directly by client authentication computing platform 110 (e.g., by interrogating client computing device 130, client computing device 140, and/or one or more other devices) and/or activity data captured by account portal computing platform 120 (e.g., based on interactions with one or more pages hosted by account portal computing platform 120) and provided by account portal computing platform 120 to client authentication computing platform 110.

In some embodiments, building the first user-specific authentication model for the first user account may include: receiving parameter-based activity data associated with at least two login events involving the first user account; calculating one or more profile values for one or more authentication parameters based on the parameter-based activity data associated with the at least two login events involving the first user account; and storing the one or more profile values calculated for the one or more authentication parameters in a dataset defining the first user-specific authentication model. For example, in building the first user-specific authentication model for the first user account at step 204, client authentication computing platform 110 may receive parameter-based activity data associated with at least two login events involving the first user account. Such parameter-based activity data may, for instance, be retrieved from a database maintained by client authentication computing platform 110 and may include activity data corresponding to the first set of login events processed by client authentication computing platform 110 and/or activity data corresponding to one or more other login events previously processed by client authentication computing platform 110. Subsequently, client authentication computing platform 110 may calculate one or more profile values for one or more authentication parameters based on the parameter-based activity data associated with the at least two login events involving the first user account. For instance, for each parameter, client authentication computing platform 110 may calculate a target value based on an average value of a plurality of measured values across the at least two login events as well as a tolerance value based on a standard deviation of the plurality of measured values. Then, client authentication computing platform 110 may store the one or more profile values calculated for the one or more authentication parameters in a dataset defining the first user-specific authentication model. For instance, client authentication computing platform 110 may store the one or more profile values to create and/or update the first user-specific authentication model for the first user account.

In some embodiments, the first activity data captured during the first set of login events associated with the first user account may include information identifying one or more device identifiers, one or more network addresses, one or more internet service providers, one or more device versions, one or more device operating systems, one or more device operating system versions, one or more device locations, one or more requested channels, one or more requested pages, one or more sequences of page requests, or one or more timings between page requests. For example, the first activity data captured during the first set of login events associated with the first user account (which may, e.g., be used by client authentication computing platform 110 in building the first user-specific authentication model for the first user account at step 204) may include information identifying one or more device identifiers, one or more network addresses, one or more internet service providers, one or more device versions, one or more device operating systems, one or more device operating system versions, one or more device locations, one or more requested channels (e.g., online banking, mobile banking, interactive voice response), one or more requested pages (e.g., view account balances and history, transfer funds, pay electronic bills, update account information), one or more sequences of page requests, and/or one or more timings between page requests. Each of these items of information may, for instance, be and/or correspond to a different parameter in the parameter-based activity data that is used by client authentication computing platform 110 in authenticating requests using the user-specific and/or population-level authentication models. Additionally or alternatively, each of these items of information may, for instance, be and/or correspond to a different parameter in the parameter-based activity data that is used by client authentication computing platform 110 in building the user-specific and/or population-level authentication models.

Figure 2B:
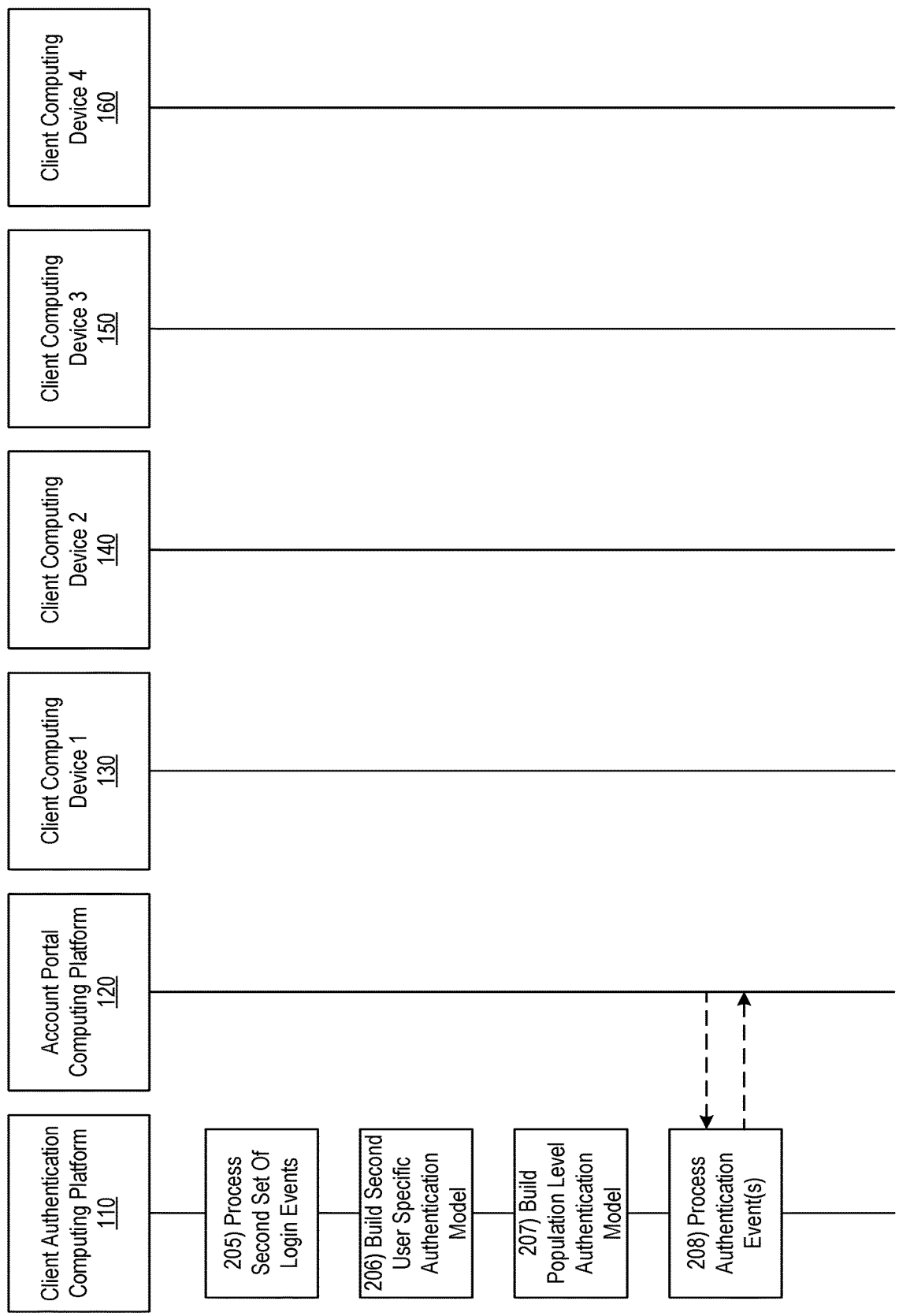

Referring to FIG. 2B, at step 205, client authentication computing platform 110 may process a second set of login events associated with a second user account. For instance, over a significant period of time (e.g., several hours, several day, several weeks, or the like), client authentication computing platform 110 may process a second set of login events associated with a second user account (which may, e.g., be linked to a user of client computing device 150 and/or client computing device 160).

In some embodiments, processing the second set of login events associated with the second user account may include: receiving, via the communication interface, from an account portal computing platform, a second authentication request associated with a second client computing device requesting access to one or more secured information resources associated with the second user account; validating one or more authentication credentials associated with the second authentication request; and based on validating the one or more authentication credentials associated with the second authentication request, generating one or more authentication commands directing the account portal computing platform to provide the second client computing device with access to the one or more secured information resources associated with the second user account. For example, in processing the second set of login events associated with the second user account at step 205, client authentication computing platform 110 may receive, via the communication interface (e.g., communication interface 113), from an account portal computing platform (e.g., account portal computing platform 120), a second authentication request associated with a second client computing device (e.g., client computing device 150) requesting access to one or more secured information resources associated with the second user account. Subsequently, client authentication computing platform 110 may validate one or more authentication credentials associated with the second authentication request (e.g., a username, password, one-time passcode, biometric credentials, and/or other credentials received from client computing device 150 and/or account portal computing platform 120). Then, based on validating the one or more authentication credentials associated with the second authentication request, client authentication computing platform 110 may generate one or more authentication commands directing the account portal computing platform (e.g., account portal computing platform 120) to provide the second client computing device (e.g., client computing device 150) with access to the one or more secured information resources associated with the second user account. In addition, client authentication computing platform 110 may send these commands to account portal computing platform 120 to trigger and/or otherwise cause account portal computing platform 120 to provide client computing device 150 with access to the second user account.

At step 206, client authentication computing platform 110 may build a user-specific authentication model. For example, at step 206, client authentication computing platform 110 may build a second user-specific authentication model for the second user account based on second activity data captured during the second set of login events associated with the second user account. The second activity data captured during the second set of login events associated with the second user account may, for instance, include activity data captured directly by client authentication computing platform 110 (e.g., by interrogating client computing device 150, client computing device 160, and/or one or more other devices) and/or activity data captured by account portal computing platform 120 (e.g., based on interactions with one or more pages hosted by account portal computing platform 120) and provided by account portal computing platform 120 to client authentication computing platform 110.

In some embodiments, building the second user-specific authentication model for the second user account may include: receiving parameter-based activity data associated with at least two login events involving the second user account; calculating one or more profile values for one or more authentication parameters based on the parameter-based activity data associated with the at least two login events involving the second user account; and storing the one or more profile values calculated for the one or more authentication parameters in a dataset defining the second user-specific authentication model. For example, in building the second user-specific authentication model for the second user account at step 206, client authentication computing platform 110 may receive parameter-based activity data associated with at least two login events involving the second user account. Such parameter-based activity data may, for instance, be retrieved from a database maintained by client authentication computing platform 110 and may include activity data corresponding to the second set of login events processed by client authentication computing platform 110 and/or activity data corresponding to one or more other login events previously processed by client authentication computing platform 110. Subsequently, client authentication computing platform 110 may calculate one or more profile values for one or more authentication parameters based on the parameter-based activity data associated with the at least two login events involving the second user account. For instance, for each parameter, client authentication computing platform 110 may calculate a target value based on an average value of a plurality of measured values across the at least two login events as well as a tolerance value based on a standard deviation of the plurality of measured values. Then, client authentication computing platform 110 may store the one or more profile values calculated for the one or more authentication parameters in a dataset defining the second user-specific authentication model. For instance, client authentication computing platform 110 may store the one or more profile values to create and/or update the second user-specific authentication model for the second user account.

In some embodiments, the second activity data captured during the second set of login events associated with the second user account may include information identifying one or more device identifiers, one or more network addresses, one or more internet service providers, one or more device versions, one or more device operating systems, one or more device operating system versions, one or more device locations, one or more requested channels, one or more requested pages, one or more sequences of page requests, or one or more timings between page requests.

For example, the second activity data captured during the second set of login events associated with the second user account (which may, e.g., be used by client authentication computing platform 110 in building the second user-specific authentication model for the second user account at step 206) may include information identifying one or more device identifiers, one or more network addresses, one or more internet service providers, one or more device versions, one or more device operating systems, one or more device operating system versions, one or more device locations, one or more requested channels (e.g., online banking, mobile banking, interactive voice response), one or more requested pages (e.g., view account balances and history, transfer funds, pay electronic bills, update account information), one or more sequences of page requests, and/or one or more timings between page requests. Each of these items of information may, for instance, be and/or correspond to a different parameter in the parameter-based activity data that is used by client authentication computing platform 110 in authenticating requests using the user-specific and/or population-level authentication models. Additionally or alternatively, each of these items of information may, for instance, be and/or correspond to a different parameter in the parameter-based activity data that is used by client authentication computing platform 110 in building the user-specific and/or population-level authentication models.

At step 207, client authentication computing platform 110 may build a population-level authentication model. For example, at step 207, client authentication computing platform 110 may build a population-level authentication model for a plurality of user accounts based on the first activity data captured during the first set of login events associated with the first user account and the second activity data captured during the second set of login events associated with the second user account. In some instances, client authentication computing platform 110 may build the population-level authentication model for the plurality of user accounts based on a plurality of user-specific authentication models (e.g., by averaging and/or otherwise combining the first user-specific authentication model, the second user-specific authentication model, and/or one or more other user-specific authentication models).

In some embodiments, building the population-level authentication model for the plurality of user accounts may include: receiving parameter-based activity data associated with at least two login events involving at least two different user accounts; calculating one or more population-target values for one or more authentication parameters based on the parameter-based activity data associated with the at least two login events involving the at least two different user accounts; and storing the one or more population-target values calculated for the one or more authentication parameters in a dataset defining the population-level authentication model. For example, in building the population-level authentication model for the plurality of user accounts, client authentication computing platform 110 may receive parameter-based activity data associated with at least two login events involving at least two different user accounts. Such parameter-based activity data may, for instance, be retrieved from a database maintained by client authentication computing platform 110 and may include activity data associated with the first set of login events processed by client authentication computing platform 110, activity data associated with the second set of login events processed by client authentication computing platform 110, and/or activity data associated with one or more other sets of login events previously processed by client authentication computing platform 110. Subsequently, client authentication computing platform 110 may calculate one or more population-target values for one or more authentication parameters based on the parameter-based activity data associated with the at least two login events involving the at least two different user accounts. For instance, for each parameter, client authentication computing platform 110 may calculate a target value based on an average value of a plurality of measured values across the at least two login events as well as a tolerance value based on a standard deviation of the plurality of measured values. Then, client authentication computing platform 110 may store the one or more population-target values calculated for the one or more authentication parameters in a dataset defining the population-level authentication model. For instance, client authentication computing platform 110 may store the one or more profile values to create and/or update the population-level authentication model (which may, e.g., describe valid activity of and/or be used in authenticating all users in a registered user base of the portal hosted by account portal computing platform 120).

At step 208, client authentication computing platform 110 may process one or more authentication events. For example, at step 208 client authentication computing platform 110 may process one or more authentication events using the first user-specific authentication model, the second user-specific authentication model, one or more other user-specific authentication models, and/or the population-level authentication model. In addition to using one or more authentication models (e.g., to evaluate and/or confirm whether actual, measured user activity data in a particular session is valid relative to corresponding parameters of the one or more authentication models), client authentication computing platform 110 also may receive and/or validate one or more authentication credentials. In addition, based on evaluating actual, measured user activity data against corresponding parameters of one or more authentication models and/or based on validating one or more authentication credentials, client authentication computing platform 110 may grant and/or deny access to a portal hosted by account portal computing platform 120 and/or other secured information resources.

Figure 2C:
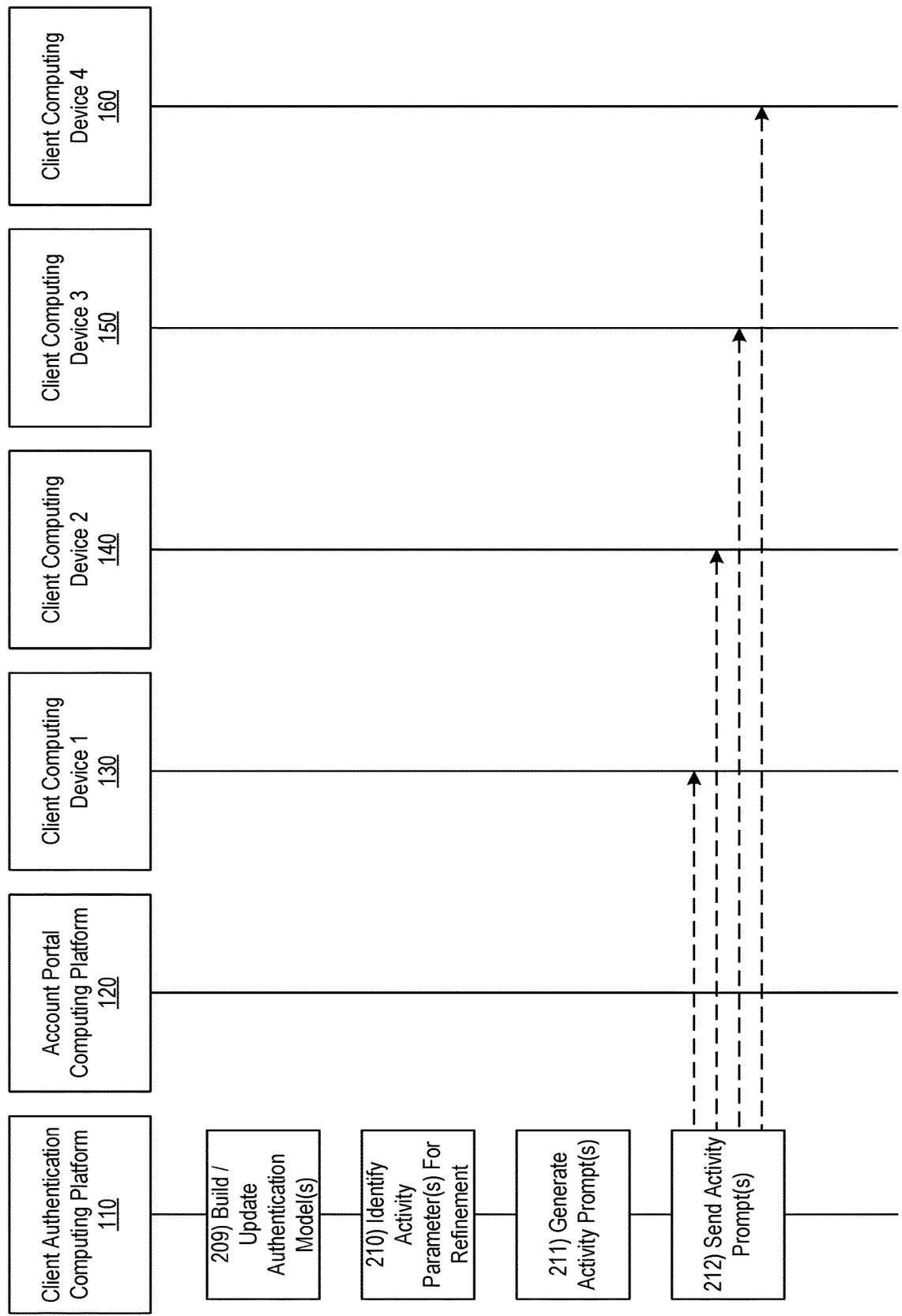

Referring to FIG. 2C, at step 209, client authentication computing platform 110 may build and/or update one or more authentication models. For instance, based on processing one or more authentication events at step 208, at step 209, client authentication computing platform 110 may update the first user-specific authentication model, the second user-specific authentication model, one or more other user-specific authentication models, and/or the population-level authentication model (e.g., by performing functions similar to those described above in building such models). Additionally or alternatively, client authentication computing platform 110 may create one or more new user-specific authentication models (e.g., for user accounts that do not already have an existing model) by performing functions similar to those described above in building user-specific authentication models.

At step 210, client authentication computing platform 110 may identify one or more activity parameters of one or more authentication models to be refined and/or otherwise updated. For example, at step 210, client authentication computing platform 110 may identify one or more activity parameters associated with at least one authentication model for refinement.

In some embodiments, identifying the one or more activity parameters associated with the at least one authentication model for refinement may include identifying a first activity parameter for refinement in response to determining that an amount of measured data associated with the first activity parameter is below a predetermined threshold corresponding to the first activity parameter. For example, in identifying the one or more activity parameters associated with the at least one authentication model for refinement at step 210, client authentication computing platform 110 may identify a first activity parameter for refinement in response to determining that an amount of measured data associated with the first activity parameter is below a predetermined threshold corresponding to the first activity parameter. For instance, client authentication computing platform 110 may maintain a plurality of parameter-specific thresholds that identify what constitutes a lack of data for each particular parameter to be used in authentication, and client authentication computing platform 110 may utilize this plurality of parameter-specific thresholds in determining whether additional measured data is required for one or more specific parameters (which may, e.g., include and/or correspond to one or more device identifiers, one or more network addresses, one or more internet service providers, one or more device versions, one or more device operating systems, one or more device operating system versions, one or more device locations, one or more requested channels, one or more requested pages, one or more sequences of page requests, one or more timings between page requests, and/or other information captured during login events, as discussed above).

In some embodiments, identifying the one or more activity parameters associated with the at least one authentication model for refinement may include identifying a second activity parameter for refinement in response to determining that measured data associated with the second activity parameter has expired. For example, in identifying the one or more activity parameters associated with the at least one authentication model for refinement at step 210, client authentication computing platform 110 may identify a second activity parameter for refinement in response to determining that measured data associated with the second activity parameter has expired. For instance, client authentication computing platform 110 may maintain a plurality of parameter-specific timing values that identify how recent measured data is and/or when specific data and/or other values for each particular parameter to be used in authentication expire, and client authentication computing platform 110 may utilize this plurality of parameter-specific timing values in determining whether additional, updated measured data is required for one or more specific parameters (which may, e.g., include and/or correspond to one or more device identifiers, one or more network addresses, one or more internet service providers, one or more device versions, one or more device operating systems, one or more device operating system versions, one or more device locations, one or more requested channels, one or more requested pages, one or more sequences of page requests, one or more timings between page requests, and/or other information captured during login events, as discussed above).

In some embodiments, identifying the one or more activity parameters associated with the at least one authentication model for refinement may include determining that the first user-specific authentication model for the first user account or the second user-specific authentication model for the second user account requires refinement. For example, in identifying the one or more activity parameters associated with the at least one authentication model for refinement at step 210, client authentication computing platform 110 may determine that the first user-specific authentication model for the first user account and/or the second user-specific authentication model for the second user account requires refinement. Client authentication computing platform 110 may, for instance, determine that the first user-specific authentication model for the first user account and/or the second user-specific authentication model for the second user account requires refinement based on client authentication computing platform 110 having insufficient measured and/or other model data (e.g., as discussed above) for the particular model(s), expired measured and/or other model data (e.g., as discussed above) for the particular model(s), and/or other factors associated with the particular model(s).

In some embodiments, identifying the one or more activity parameters associated with the at least one authentication model for refinement may include determining that the population-level authentication model for the plurality of user accounts requires refinement. For example, in identifying the one or more activity parameters associated with the at least one authentication model for refinement at step 210, client authentication computing platform 110 may determine that the population-level authentication model for the plurality of user accounts requires refinement. Client authentication computing platform 110 may, for instance, determine that the population-level authentication model for the plurality of user accounts requires refinement based on client authentication computing platform 110 having insufficient measured and/or other model data (e.g., as discussed above) for the population-level authentication model, expired measured and/or other model data (e.g., as discussed above) for the population-level authentication model, and/or other factors associated with the population-level authentication model.

At step 211, client authentication computing platform 110 may generate one or more activity prompts (e.g., to gather additional, updated data for the one or more parameters identified at step 210). For example, at step 211, client authentication computing platform 110 may generate one or more activity prompts based on the one or more activity parameters associated with the at least one authentication model identified for refinement. At step 212, client authentication computing platform 110 may send the one or more activity prompts. For example, at step 212, client authentication computing platform 110 may send, via the communication interface (e.g., communication interface 113), to at least one client computing device (e.g., client computing device 130, client computing device 140, client computing device 150, client computing device 160), at least one activity prompt of the one or more activity prompts generated at step 211. In addition, by sending the at least one activity prompt of the one or more activity prompts, client authentication computing platform 110 may cause the at least one client computing device (e.g., client computing device 130, client computing device 140, client computing device 150, client computing device 160) to request at least one user response corresponding to the at least one activity prompt of the one or more activity prompts.

Figure 3:
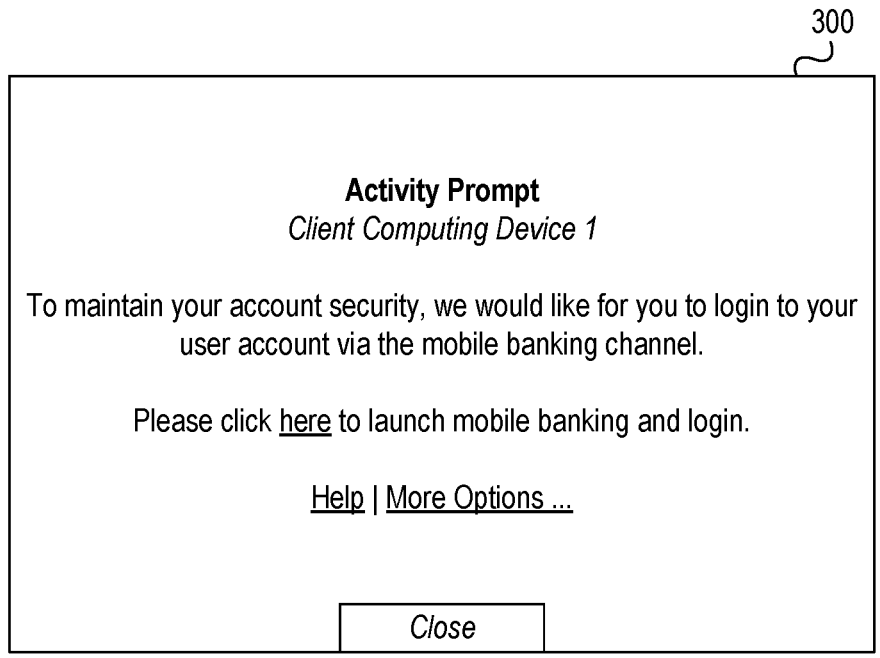
FIGS. 3-6 depict example graphical user interfaces for dynamically generating activity prompts to build and refine machine learning authentication models in accordance with one or more example embodiments.

In some embodiments, generating the one or more activity prompts based on the one or more activity parameters associated with the at least one authentication model identified for refinement may include generating at least one activity prompt requesting a user to login via a specific channel of a plurality of channels via which secured information resources are accessible. For example, in generating the one or more activity prompts based on the one or more activity parameters associated with the at least one authentication model identified for refinement at step 211, client authentication computing platform 110 may generate at least one activity prompt requesting a user to login via a specific channel of a plurality of channels via which secured information resources are accessible. By sending such an activity prompt at step 212, client authentication computing platform 110 may, for instance, cause a client computing device (e.g., client computing device 130) to display and/or otherwise present a graphical user interface similar to graphical user interface 300, which is depicted in FIG. 3. As seen in FIG. 3, graphical user interface 300 may include text and/or other information prompting a user of client computing device 130 to login via a specific channel of a plurality of channels via which secured information resources are accessible (e.g., "To maintain your account security, we would like for you to login to your user account via the mobile banking channel. Please click here to launch mobile banking and login.").

Figure 4:
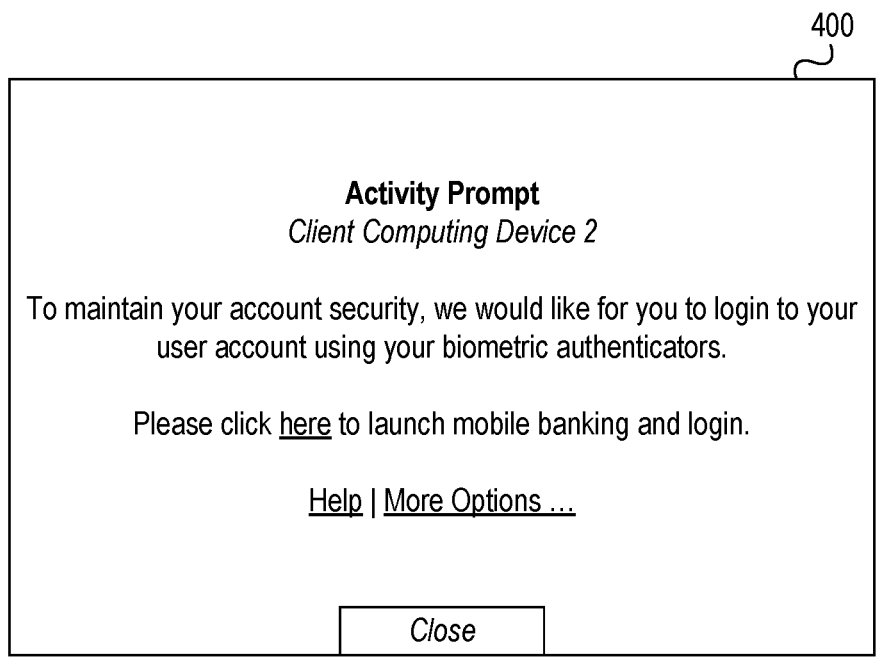

In some embodiments, generating the one or more activity prompts based on the one or more activity parameters associated with the at least one authentication model identified for refinement may include generating at least one activity prompt requesting a user to login using one or more specific authenticators of a plurality of authenticators implemented by the computing platform. For example, in generating the one or more activity prompts based on the one or more activity parameters associated with the at least one authentication model identified for refinement at step 211, client authentication computing platform 110 may generate at least one activity prompt requesting a user to login using one or more specific authenticators of a plurality of authenticators implemented by the computing platform (e.g., client authentication computing platform 110). By sending such an activity prompt at step 212, client authentication computing platform 110 may, for instance, cause a client computing device (e.g., client computing device 140) to display and/or otherwise present a graphical user interface similar to graphical user interface 400, which is depicted in FIG. 4. As seen in FIG. 4, graphical user interface 400 may include text and/or other information prompting a user of client computing device 140 to login using one or more specific authenticators of a plurality of authenticators implemented by client authentication computing platform 110 (e.g., "To maintain your account security, we would like for you to login to your user account using your biometric authenticators. Please click here to launch mobile banking and login.").

Figure 5:
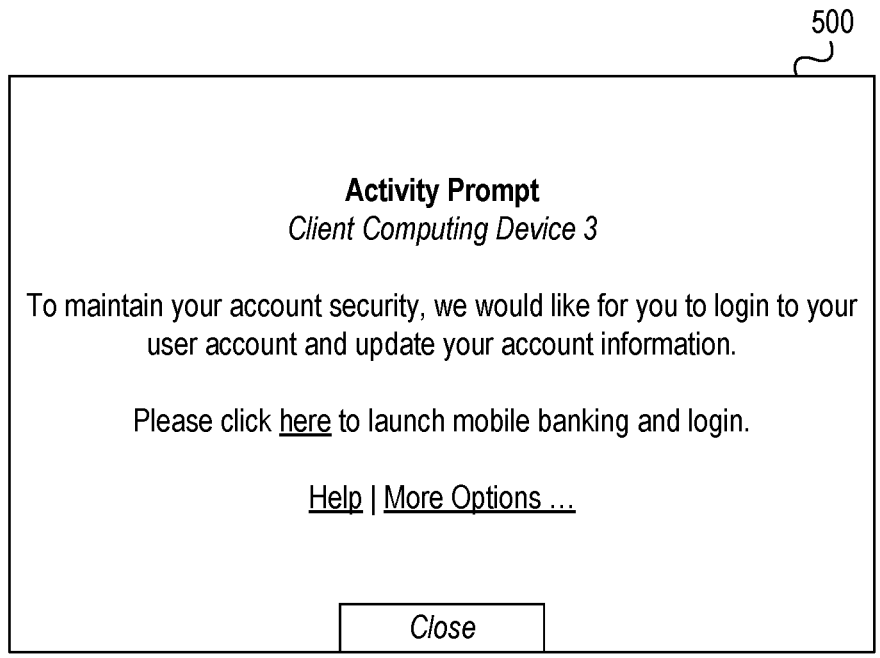
Figure 6:
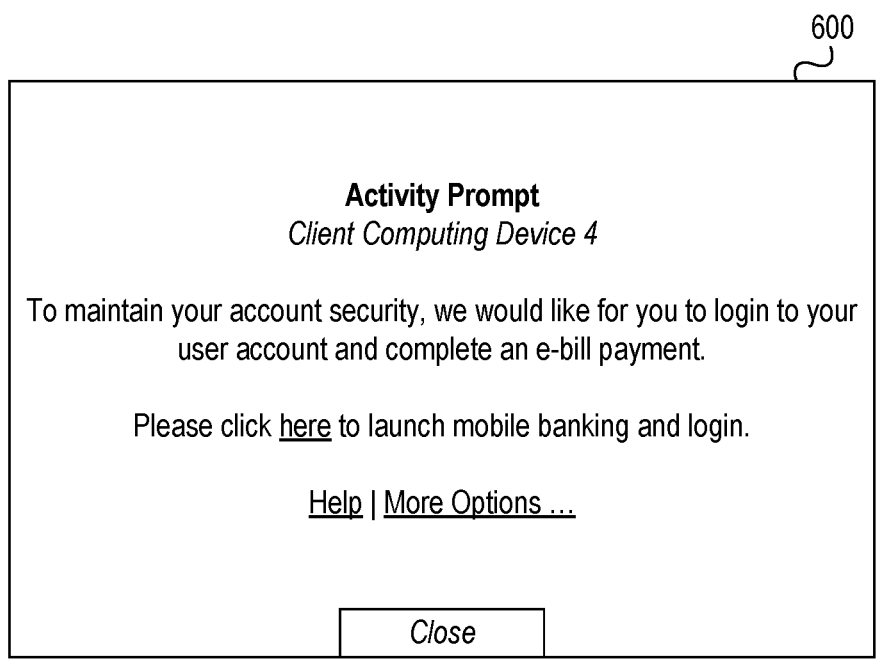

In some embodiments, generating the one or more activity prompts based on the one or more activity parameters associated with the at least one authentication model identified for refinement may include generating at least one activity prompt requesting a user to login to a portal hosted by an account portal computing platform and use one or more specific functions of a plurality of functions provided via the portal hosted by the account portal computing platform. For example, in generating the one or more activity prompts based on the one or more activity parameters associated with the at least one authentication model identified for refinement at step 211, client authentication computing platform 110 may generate at least one activity prompt requesting a user to login to a portal hosted by an account portal computing platform (e.g., account portal computing platform 120) and use one or more specific functions of a plurality of functions provided via the portal hosted by the account portal computing platform (e.g., account portal computing platform 120). By sending such an activity prompt at step 212, client authentication computing platform 110 may, for instance, cause a client computing device (e.g., client computing device 150) to display and/or otherwise present a graphical user interface similar to graphical user interface 500, which is depicted in FIG. 5. As seen in FIG. 5, graphical user interface 500 may include text and/or other information prompting a user of client computing device 150 to login to a portal hosted by account portal computing platform 120 and use one or more specific functions of a plurality of functions provided via the portal hosted by account portal computing platform 120 (e.g., "To maintain your account security, we would like for you to login to your user account and update your account information. Please click here to launch mobile banking and login."). Additionally or alternatively, by sending such an activity prompt at step 212, client authentication computing platform 110 may, for instance, cause a client computing device (e.g., client computing device 160) to display and/or otherwise present a graphical user interface similar to graphical user interface 600, which is depicted in FIG. 6. As seen in FIG. 6, graphical user interface 600 may include text and/or other information prompting a user of client computing device 160 to login to a portal hosted by account portal computing platform 120 and use one or more specific functions of a plurality of functions provided via the portal hosted by account portal computing platform 120 (e.g., "To maintain your account security, we would like for you to login to your user account and complete an e-bill payment. Please click here to launch mobile banking and login.").

Figure 2D:
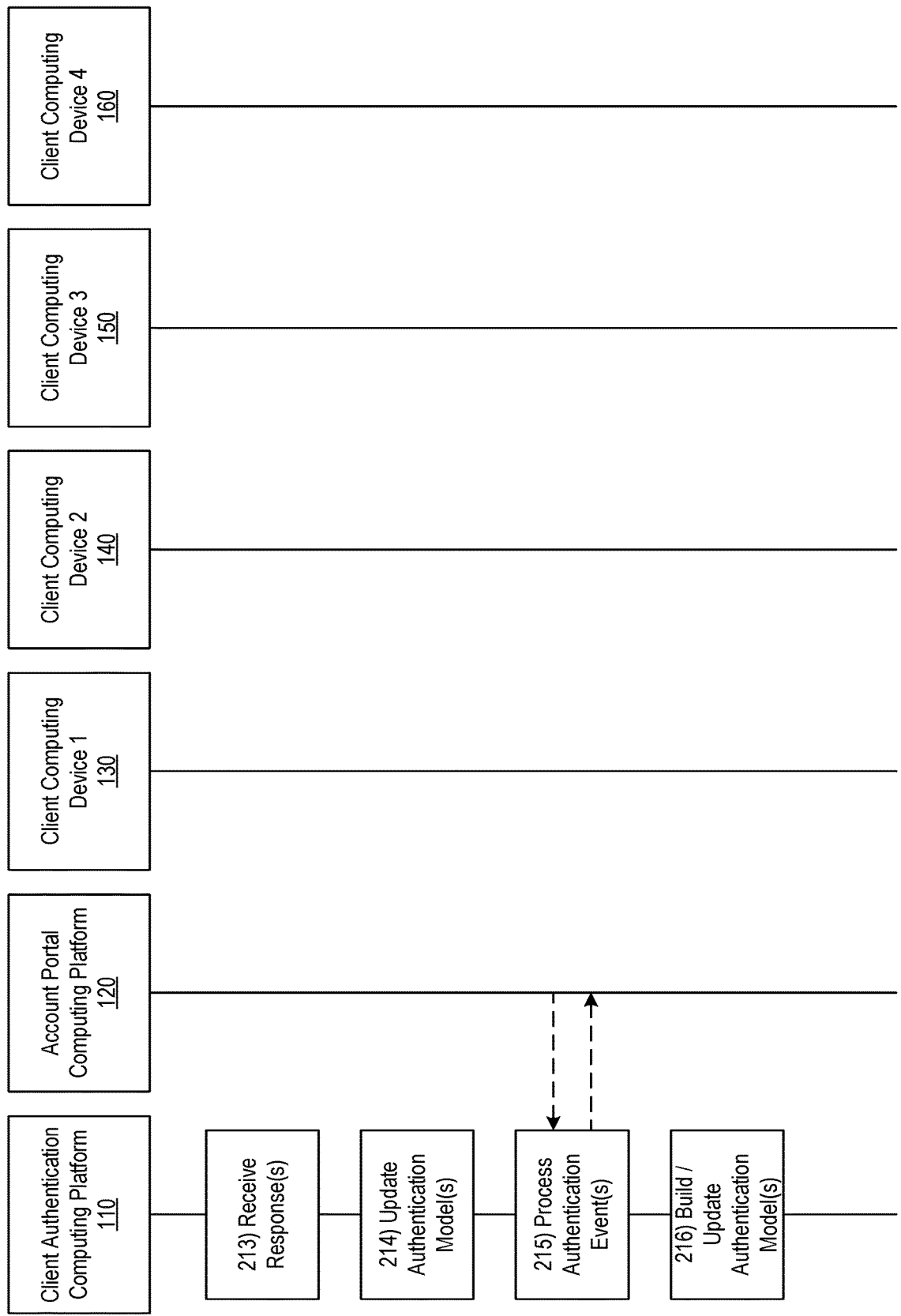

Referring to FIG. 2D, at step 213, client authentication computing platform 110 may receive one or more responses to the one or more activity prompts. Such responses may, for instance, be received by client authentication computing platform 110 from account portal computing platform 120 and/or from one or more of the client computing devices to which the activity prompts were sent (e.g., client computing device 130, client computing device 140, client computing device 150, client computing device 160). At step 214, client authentication computing platform 110 may update one or more authentication models based on the one or more responses to the one or more activity prompts received at step 213.

For example, at step 213, client authentication computing platform 110 may receive at least one response to the at least one activity prompt of the one or more activity prompts (e.g., from client computing device 130, client computing device 140, and/or account portal computing platform 120). Then, at step 214, client authentication computing platform 110 may, for instance, update the first user-specific authentication model for the first user account based on the at least one response to the at least one activity prompt of the one or more activity prompts. For instance, at step 214, client authentication computing platform 110 may recalculate one or more profile values associated with the first user-specific authentication model for the first user account based on the at least one response received at step 213, similar to how client authentication computing platform 110 may calculate such profile values when building the model (e.g., as described above).

As another example, at step 213, client authentication computing platform 110 may receive at least one response to the at least one activity prompt of the one or more activity prompts (e.g., from client computing device 150, client computing device 160, and/or account portal computing platform 120). Then, at step 214, client authentication computing platform 110 may, for instance, update the second user-specific authentication model for the second user account based on the at least one response to the at least one activity prompt of the one or more activity prompts. For instance, at step 214, client authentication computing platform 110 may recalculate one or more profile values associated with the second user-specific authentication model for the second user account based on the at least one response received at step 213, similar to how client authentication computing platform 110 may calculate such profile values when building the model (e.g., as described above).

As another example, at step 213, client authentication computing platform 110 may receive at least one response to the at least one activity prompt of the one or more activity prompts (e.g., from client computing device 130, client computing device 140, client computing device 150, client computing device 160, and/or account portal computing platform 120). Then, at step 214, client authentication computing platform 110 may update the population-level authentication model for the plurality of user accounts based on the at least one response to the at least one activity prompt of the one or more activity prompts. For instance, at step 214, client authentication computing platform 110 may recalculate one or more population-target values associated with the population-level authentication model for the plurality of user accounts based on the at least one response received at step 213, similar to how client authentication computing platform 110 may calculate such population-target values when building the model (e.g., as described above).

Subsequently, client authentication computing platform 110 may continue to process authentication events and build and/or update machine-learning authentication models. For example, at step 215, client authentication computing platform 110 may process one or more authentication events using the first user-specific authentication model, the second user-specific authentication model, one or more other user-specific authentication models, and/or the population-level authentication model. In addition to using one or more authentication models (e.g., to evaluate and/or confirm whether actual, measured user activity data in a particular session is valid relative to corresponding parameters of the one or more authentication models), client authentication computing platform 110 also may receive and/or validate one or more authentication credentials. In addition, based on evaluating actual, measured user activity data against corresponding parameters of one or more authentication models and/or based on validating one or more authentication credentials, client authentication computing platform 110 may grant and/or deny access to the portal hosted by account portal computing platform 120 and/or other secured information resources.

In addition, at step 216, client authentication computing platform 110 may build and/or update one or more authentication models. For instance, based on processing one or more authentication events at step 215, at step 216, client authentication computing platform 110 may update the first user-specific authentication model, the second user-specific authentication model, one or more other user-specific authentication models, and/or the population-level authentication model (e.g., by performing functions similar to those described above in building and/or updating such models). Additionally or alternatively, client authentication computing platform 110 may create one or more new user-specific authentication models (e.g., for user accounts that do not already have an existing model) by performing functions similar to those described above in building user-specific authentication models.

In some instances, client authentication computing platform 110 also may perform other functions based on receiving at least one response to the at least one activity prompt of the one or more activity prompts and/or based on processing additional authentication events. For instance, client authentication computing platform 110 may set a user-specific trust level based on at least one response to the at least one activity prompt of the one or more activity prompts. Such a user-specific trust level may, for instance, establish a higher trust level for a temporary period of time (e.g., one day, one week, or the like) for a particular user and may allow the user to complete tasks via the portal hosted by account portal computing platform 120 that typically require a higher level of security (e.g., high-value transfers, mortgage paperwork, or the like).

In some instances, client authentication computing platform 110 also may provide incentives and/or rewards to specific users based on receiving at least one response to the at least one activity prompt of the one or more activity prompts and/or based on processing additional authentication events. For instance, client authentication computing platform 110 may generate, send, and/or otherwise provide coupons, gift cards, and/or rewards messages that may be redeemable by an individual user for cash, points, and/or other rewards. By generating and/or otherwise providing such incentives and/or rewards, client authentication computing platform 110 may, for instance, incentivize users to respond to the activity prompts described above and thus assist in building and/or updating the machine-learning authentication models described above.

FIG. 7 depicts an illustrative method for dynamically generating activity prompts to build and refine machine learning authentication models in accordance with one or more example embodiments. Referring to FIG. 7, at step 705, a computing platform having at least one processor, a communication interface, and memory may process a first set of login events associated with a first user account. At step 710, the computing platform may build a first user-specific authentication model for the first user account based on first activity data captured during the first set of login events associated with the first user account. At step 715, the computing platform may process a second set of login events associated with a second user account. At step 720, the computing platform may build a second user-specific authentication model for the second user account based on second activity data captured during the second set of login events associated with the second user account. At step 725, the computing platform may build a population-level authentication model for a plurality of user accounts based on the first activity data captured during the first set of login events associated with the first user account and the second activity data captured during the second set of login events associated with the second user account.

At step 730, the computing platform may identify one or more activity parameters associated with at least one authentication model for refinement. At step 735, the computing platform may generate one or more activity prompts based on the one or more activity parameters associated with the at least one authentication model identified for refinement. At step 740, the computing platform may send, via the communication interface, to at least one client computing device, at least one activity prompt of the one or more activity prompts. In addition, by sending the at least one activity prompt of the one or more activity prompts, the computing platform may cause the at least one client computing device to request at least one user response corresponding to the at least one activity prompt of the one or more activity prompts.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   process a first set of login events associated with a first user account;
   build a first user-specific authentication model for the first user account based on first activity data captured during the first set of login events associated with the first user account;
   process a second set of login events associated with a second user account;
   build a second user-specific authentication model for the second user account based on second activity data captured during the second set of login events associated with the second user account;
   build a population-level authentication model for a plurality of user accounts based on the first activity data captured during the first set of login events associated with the first user account and the second activity data captured during the second set of login events associated with the second user account;
   identify one or more activity parameters associated with at least one authentication model for refinement;
   generate one or more activity prompts based on the one or more activity parameters associated with the at least one authentication model identified for refinement; and
   send, via the communication interface, to at least one client computing device, at least one activity prompt of the one or more activity prompts, wherein sending the at least one activity prompt of the one or more activity prompts causes the at least one client computing device to request at least one user response corresponding to the at least one activity prompt of the one or more activity prompts.

2. The computing platform of claim 1, wherein processing the first set of login events associated with the first user account comprises:
   receiving, via the communication interface, from an account portal computing platform, a first authentication request associated with a first client computing device requesting access to one or more secured information resources associated with the first user account;
   validating one or more authentication credentials associated with the first authentication request; and
   based on validating the one or more authentication credentials associated with the first authentication request, generating one or more authentication commands directing the account portal computing platform to provide the first client computing device with access to the one or more secured information resources associated with the first user account.

3. The computing platform of claim 1, wherein building the first user-specific authentication model for the first user account comprises:
   receiving parameter-based activity data associated with at least two login events involving the first user account;
   calculating one or more profile values for one or more authentication parameters based on the parameter-based activity data associated with the at least two login events involving the first user account; and
   storing the one or more profile values calculated for the one or more authentication parameters in a dataset defining the first user-specific authentication model.

4. The computing platform of claim 1, wherein the first activity data captured during the first set of login events associated with the first user account comprises information identifying one or more device identifiers, one or more network addresses, one or more internet service providers, one or more device versions, one or more device operating systems, one or more device operating system versions, one or more device locations, one or more requested channels, one or more requested pages, one or more sequences of page requests, or one or more timings between page requests.

5. The computing platform of claim 1, wherein processing the second set of login events associated with the second user account comprises:
   receiving, via the communication interface, from an account portal computing platform, a second authentication request associated with a second client computing device requesting access to one or more secured information resources associated with the second user account;
   validating one or more authentication credentials associated with the second authentication request; and
   based on validating the one or more authentication credentials associated with the second authentication request, generating one or more authentication commands directing the account portal computing platform to provide the second client computing device with access to the one or more secured information resources associated with the second user account.

6. The computing platform of claim 1, wherein building the second user-specific authentication model for the second user account comprises:
   receiving parameter-based activity data associated with at least two login events involving the second user account;
   calculating one or more profile values for one or more authentication parameters based on the parameter-based activity data associated with the at least two login events involving the second user account; and
   storing the one or more profile values calculated for the one or more authentication parameters in a dataset defining the second user-specific authentication model.

7. The computing platform of claim 1, wherein the second activity data captured during the second set of login events associated with the second user account comprises information identifying one or more device identifiers, one or more network addresses, one or more internet service providers, one or more device versions, one or more device operating systems, one or more device operating system versions, one or more device locations, one or more requested channels, one or more requested pages, one or more sequences of page requests, or one or more timings between page requests.

8. The computing platform of claim 1, wherein building the population-level authentication model for the plurality of user accounts comprises:

receiving parameter-based activity data associated with at least two login events involving at least two different user accounts;

calculating one or more population-target values for one or more authentication parameters based on the parameter-based activity data associated with the at least two login events involving the at least two different user accounts; and storing the one or more population-target values calculated for the one or more authentication parameters in a dataset defining the population-level authentication model.

9. The computing platform of claim 1, wherein identifying the one or more activity parameters associated with the at least one authentication model for refinement comprises identifying a first activity parameter for refinement in response to determining that an amount of measured data associated with the first activity parameter is below a predetermined threshold corresponding to the first activity parameter.

10. The computing platform of claim 1, wherein identifying the one or more activity parameters associated with the at least one authentication model for refinement comprises identifying a second activity parameter for refinement in response to determining that measured data associated with the second activity parameter has expired.

11. The computing platform of claim 1, wherein identifying the one or more activity parameters associated with the at least one authentication model for refinement comprises determining that the first user-specific authentication model for the first user account or the second user-specific authentication model for the second user account requires refinement.

12. The computing platform of claim 1, wherein identifying the one or more activity parameters associated with the at least one authentication model for refinement comprises determining that the population-level authentication model for the plurality of user accounts requires refinement.

13. The computing platform of claim 1, wherein generating the one or more activity prompts based on the one or more activity parameters associated with the at least one authentication model identified for refinement comprises generating at least one activity prompt requesting a user to login via a specific channel of a plurality of channels via which secured information resources are accessible.

14. The computing platform of claim 1, wherein generating the one or more activity prompts based on the one or more activity parameters associated with the at least one authentication model identified for refinement comprises generating at least one activity prompt requesting a user to login using one or more specific authenticators of a plurality of authenticators implemented by the computing platform.

15. The computing platform of claim 1, wherein generating the one or more activity prompts based on the one or more activity parameters associated with the at least one authentication model identified for refinement comprises generating at least one activity prompt requesting a user to login to a portal hosted by an account portal computing platform and use one or more specific functions of a plurality of functions provided via the portal hosted by the account portal computing platform.

16. The computing platform of claim 1, wherein the memory stores additional computer-readable instructions that, when executed by the at least one processor, cause the computing platform to:

receive at least one response to the at least one activity prompt of the one or more activity prompts; and update the first user-specific authentication model for the first user account based on the at least one response to the at least one activity prompt of the one or more activity prompts.

17. The computing platform of claim 1, wherein the memory stores additional computer-readable instructions that, when executed by the at least one processor, cause the computing platform to:

receive at least one response to the at least one activity prompt of the one or more activity prompts; and update the second user-specific authentication model for the second user account based on the at least one response to the at least one activity prompt of the one or more activity prompts.

18. The computing platform of claim 1, wherein the memory stores additional computer-readable instructions that, when executed by the at least one processor, cause the computing platform to:

receive at least one response to the at least one activity prompt of the one or more activity prompts; and update the population-level authentication model for the plurality of user accounts based on the at least one response to the at least one activity prompt of the one or more activity prompts.

19. A method, comprising:

at a computing platform comprising at least one processor, a communication interface, and memory:

processing, by the at least one processor, a first set of login events associated with a first user account;

building, by the at least one processor, a first user-specific authentication model for the first user account based on first activity data captured during the first set of login events associated with the first user account;

processing, by the at least one processor, a second set of login events associated with a second user account;

building, by the at least one processor, a second user-specific authentication model for the second user account based on second activity data captured during the second set of login events associated with the second user account;

building, by the at least one processor, a population-level authentication model for a plurality of user accounts based on the first activity data captured during the first set of login events associated with the first user account and the second activity data captured during the second set of login events associated with the second user account;

identifying, by the at least one processor, one or more activity parameters associated with at least one authentication model for refinement;

generating, by the at least one processor, one or more activity prompts based on the one or more activity parameters associated with the at least one authentication model identified for refinement; and sending, by the at least one processor, via the communication interface, to at least one client computing device, at least one activity prompt of the one or more activity prompts, wherein sending the at least one activity prompt of the one or more activity prompts causes the at least one client computing device to request at least one user response corresponding to the at least one activity prompt of the one or more activity prompts.

20. One or more non-transitory computer-readable media storing instructions that, when executed by a computing platform comprising at least one processor, a communication interface, and memory, cause the computing platform to:
- process a first set of login events associated with a first user account;
- build a first user-specific authentication model for the first user account based on first activity data captured during the first set of login events associated with the first user account;
- process a second set of login events associated with a second user account;
- build a second user-specific authentication model for the second user account based on second activity data captured during the second set of login events associated with the second user account;
- build a population-level authentication model for a plurality of user accounts based on the first activity data captured during the first set of login events associated with the first user account and the second activity data captured during the second set of login events associated with the second user account;
- identify one or more activity parameters associated with at least one authentication model for refinement;
- generate one or more activity prompts based on the one or more activity parameters associated with the at least one authentication model identified for refinement; and
- send, via the communication interface, to at least one client computing device, at least one activity prompt of the one or more activity prompts, wherein sending the at least one activity prompt of the one or more activity prompts causes the at least one client computing device to request at least one user response corresponding to the at least one activity prompt of the one or more activity prompts.

* * * * *